United States Patent [19]

Fielding

[11] Patent Number: 4,577,891
[45] Date of Patent: Mar. 25, 1986

[54] TORQUE LIMITING COLLAR

[75] Inventor: Lawrence E. Fielding, Enon, Ohio

[73] Assignee: The United States of America as represented by the Secretary of the Air Force, Washington, D.C.

[21] Appl. No.: 546,222

[22] Filed: Oct. 27, 1983

[51] Int. Cl.⁴ .............................................. F16L 25/00
[52] U.S. Cl. ......................................... 285/62; 285/39; 285/330; 411/93
[58] Field of Search ................... 285/62, 61, 39, 330; 411/92, 93, 96

[56] References Cited

U.S. PATENT DOCUMENTS

| | | | |
|---|---|---|---|
| 3,279,827 | 10/1966 | Brown | 285/62 X |
| 3,713,686 | 1/1973 | Eddy et al. | 411/96 X |
| 3,741,603 | 6/1973 | McLean | 411/93 X |
| 4,420,022 | 12/1983 | Landry | 285/61 |

Primary Examiner—Richard J. Scanlan, Jr.
Attorney, Agent, or Firm—Donald J. Singer; John R. Flanagan; Bobby D. Scearce

[57] ABSTRACT

A torque limiting collar includes a support plate attached to a stationary support adjacent a fitting and a locking plate engaged with a nonmovable part of the fitting and bolted to the support plate. When the rotatable portion of the fitting is tightened against the nonmovable part, the torque is transmitted through the locking and support plates to the stationary support instead of being transmitted into the conduit connected to the nonmovable or rigid part of the fitting. The locking plate has an edge defined in the configuration of a segment of a socket pattern which matches and mates with the profile of the rigid part of the fitting.

4 Claims, 5 Drawing Figures

TORQUE LIMITING COLLAR

RIGHTS OF THE GOVERNMENT

The invention described herein may be manufactured and used by or for the Government of the United States for all governmental purposes without the payment of any royalty.

BACKGROUND OF THE INVENTION

1. Field of the Invention

The present invention broadly relates to devices for expediting installation and removal of fittings in hard-to-reach locations and, more particularly, is concerned with a torque limiting collar for rigidly coupling a fitting to a stationary structure so as to substantially prevent transmission of damage-inducing torque through the fitting to conduit or tubing associated with it.

2. Description of the Prior Art

Fittings in tubular conduit or tubing which transfer fluid medium under pressure require application of torque to ensure that flare, O-ring, and other types of seals in the fittings are seated to prevent leakage. Current techniques require the use of a backing or counter-coupling wrench engaged on the stationary part of the fitting while torque is applied to the nut part of the fitting. It is imperative that no movement of the stationary fitting part be permitted or damage to the fitting and/or tubular conduit will likely result. Location of the fitting, adjacent space limitations, torque values to be achieved and skill in using the backing wrench are dependent variables which affect torque application and potential damage. Failure of either the fitting or conduit often results in expensive maintenance repairs and unscheduled aircraft/equipment downtime.

In the case of the Air Force's F-16 aircraft generator housing, two specific circumstances make proper application of torque to fittings a troublesome matter. First, the generator housing is fabricated from spun cast magnesium, consequently, virtually all transmission of torque to the housing through the fitting must be avoided, such as by skilled use of a backing wrench when tightening the fitting in order to prevent damage to the housing fitting or housing due to over-application of torque. Second, however, the location of the oil fittings are not conducive to effective application of a back-up wrench to them. As a result, a significant number of generator failures have been attributed to overheating due to loss of the cooling oil stemming from damaged fittings or a cracked housing thread boss.

Consequently, a need exists for a technique to ensure application of proper torque to tubular fittings while preventing transmission of damage-inducing torque through the fittings to adjacent housing or tubular structures.

SUMMARY OF THE INVENTION

The present invention provides a torque limiting collar designed to satisfy the aforementioned needs. The collar, rigidly coupled between a fitting and a stationary structure, is composed of two plates which generate plate-to-plate frictional forces that counteract or relieve torque applied to the fitting. This prevents transmission of torque through the fitting to the portion of the generator housing connected to the fitting. Permanent pre-installation of the collar on the fixed part of the fitting eliminates dependence on the use of a backing wrench and the risks associated with a person attempting to counteract the torque applied to the movable part of the fitting during final assembly of the fitting. Design simplicity of the plates of the collar allow their fabrication through use of conventional shop stamping and broaching techniques. The collar can be readily adapted to any configuration of fitting employing a swivel or B-nut and a tubular conduit or line. Use of the torque limiting collar has all but eliminated generator overheat failures due to loss of cooling oil through damaged fittings. Furthermore, incidents of stripped and damaged threads on the housing and housing fitting have also decreased.

Accordingly, the present invention is directed to a torque limiting collar for rigidly coupling a fitting to a stationary structure so as to substantially prevent transmission of damage-inducing torque through the fitting to a conduit as a first portion of the fitting is rotatably adjusted against a second portion thereof to seal parts of the conduit together. The torque limiting collar comprises: (a) a support member disposed adjacent the fitting and rigidly connected to the stationary support; (b) a locking member disposed adjacent the fitting and including means for engaging one of the first and second portions of the fitting so as to substantially prevent the one fitting portion from rotating relative to the locking member; and (c) means for rigidly fastening the locking member to the support member. The support member includes a first plate having a plurality of holes defined therethrough and an upper planar surface. The locking member is a second plate having a plurality of openings defined therethrough and a lower planar surface. The openings of the second plate are disposed in overlapping, orthogonal alignment with the holes of the first plate, and the lower planar surface of the second plate is adapted to overlie and contact the upper planar surface of the first plate, when the second plate is disposed in locking engagement with the one fitting portion. The fastening means is a plurality of bolts received through the aligned holes and openings and adapted to clamp the plates together at their respective upper surface and lower surfaces so as to form a large area of frictional contact therebetween for relieving the torque applied to the fitting. Further, the engaging means of the locking member is an edge of the second plate having a configuration in the form of a segment of an annular pattern which matches and mates with a peripheral configuration of the one fitting portion.

DETAILED DESCRIPTION OF THE INVENTION

Figure 1:
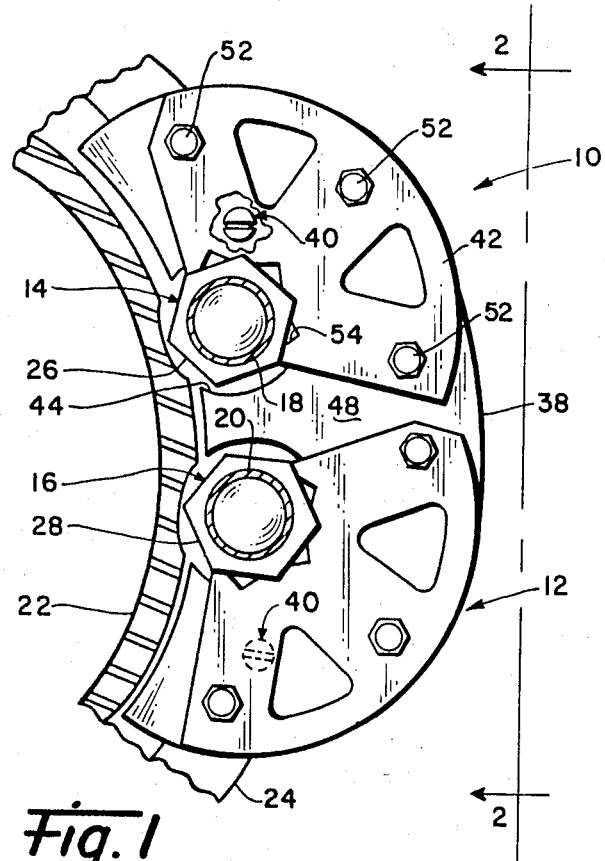
FIG. 1 is a plan view of a pair of torque limiting collars of the present invention associated with the generator housing of an F-16 aircraft.
Figure 2:
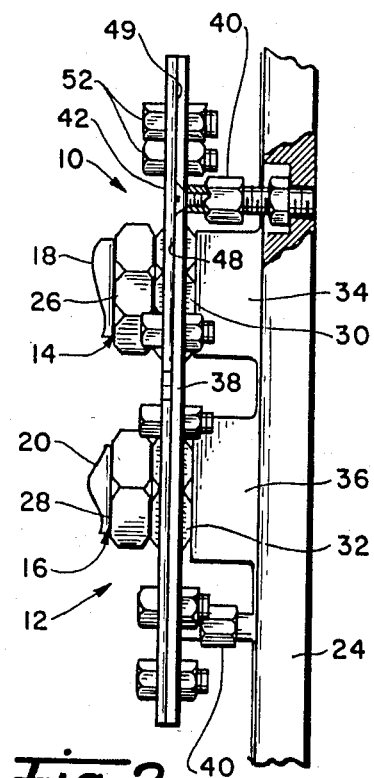
FIG. 2 is a side elevational view of the collars as seen along line 2—2 of FIG. 1.

Referring now to the drawings, and more particularly to FIGS. 1 and 2, there is shown a preferred embodiment of a pair of torque limiting collars of the present invention, being generally designated 10 and 12.

The two collars 10, 12 are used in conjunction with a pair of fittings 14, 16 for attaching conduits 18, 20 of hydraulic oil lines to a constant speed drive generator housing 22 on an F-16 aircraft. The torque limiting collars 10,12 serve the function of rigidly coupling their respective fittings to some other stationary structure 24 of the generator housing 22 than the portion of the housing connected to the fittings. Such coupling arrangement substantially prevents transmission of damage-inducing torque through the fittings 14, 16 to the respective conduits 18, 20 as respective first portions or nuts 26, 28 of the fittings are rotatably adjusted against second stationary portions 30, 32 thereof to seal parts of the conduits together. The second fitting portions 30, 32 are rigidly connected to respective parts 34, 36 of the conduits which are bosses integrally connected to the generator housing. Since each of the collars 10, 12 are identical, the description of one collar 10 will suffice for the other collar 12.

Figure 3:
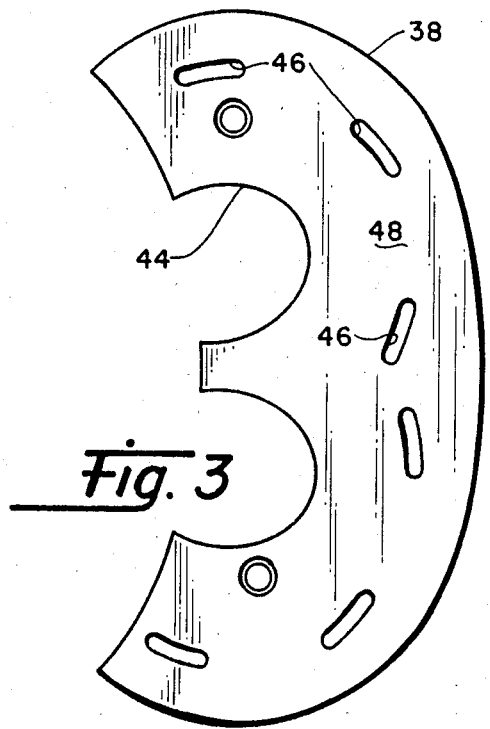
FIG. 3 is a plan view of the common support plate of the collars shown in FIGS. 1 and 2.
Figure 4:
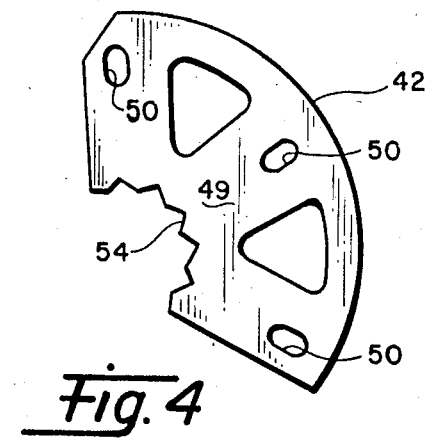
FIG. 4 is a plan view of the locking plate of one of the collars shown in FIGS. 1 and 2.

The torque limiting collar 10 comprises a support member which includes a support plate 38 (see also FIG. 3) and a stand-off connector 40. (Only the top half of plate 38 in FIGS. 1, 2 and 3 is a part of collar 10; the bottom half is a part of collar 12.) Collar 10 also includes a locking member in the form of a locking plate 42 (see also FIG. 4) and means for rigidly fastening the locking member to the support member.

The support plate 38 has a circular clearance opening 44 for receiving the fitting 14 and conduit 18 to allow positioning of the plate 38 adjacent the fitting and conduit. The plate 38 also has a plurality of slotted holes 46 and an upper planar surface 48. The plate may be fabricated from 0.125 inch sheet stock and the holes 46 formed at 60° intervals. The stand-off connector 40 is a separate threaded fastener adjustable for threadably connecting the plate 38 and the support structure 24, as seen in FIG. 2, for positioning the plate adjacent the fitting 14 and conduit 18 while rigidly interconnecting the plate 38 to the stationary structure 24.

The locking plate 42 has a lower planar surface 49 and a plurality of slotted openings 50 defined therethrough and matched in number with, but placed generally perpendicular to, the slotted holes 46 in the plate 38. The orthogonal relationship between the slotted holes 46 and openings 50 facilitates engagement of the locking plate with the stationary part 30 of the fitting 14, while maintaining alignment between the pluralities of holes and openings. The plate 42 may also be fabricated from 0.125 inch sheet stock and the openings 50 formed at 60° intervals. The means for rigidly fastening the plates 38, 42 together comprise a plurality of bolts 52 received through the aligned holes 46 and openings 50. Upon being tightened, the bolts 52 clamp the plates 38, 42 together at the respective upper surface 48 and lower surface 49 thereof so as to form a large surface area of frictional contact therebetween for relieving the torque applied to the fitting 14.

The locking plate 42 also includes means for engaging the stationary portion 30 of the fitting 14 so as to substantially prevent the fitting portion 30 from rotating relative to the locking plate 42 as the nut 26 is tightened against fitting portion 30. The engaging means preferably is an edge 54 of the locking plate 42 having a configuration in the form of a segment of an annular pattern which matches and mates with a peripheral configuration of the fixed fitting portion 30. In fabrication of plate 42, preferably a standard 12-point socket pattern is broached in the plate 42 to the size of the B-nut coupling nut which is the stationary portion 30 of the fitting 14.

Figure 5:
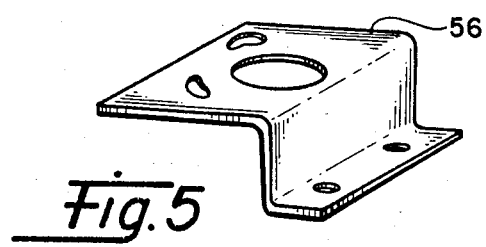
FIG. 5 is a perspective view of another embodiment of the support plate of one collar.

It should be understood that the support and locking plates 38, 42 may take many different configurations depending on the space available surrounding the particular fitting and the peripheral configuration of the fitting. Also, the support plate and stand-off connector may have a one-piece construction, such as in the case of support member 56 depicted in FIG. 5.

It is thought that the torque limiting collar of the present invention and many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

I claim:

1. A torque limiting collar for rigidly coupling a fitting to a stationary structure to prevent transmission of damage-inducing torque through said fitting to a conduit as a first portion of said fitting is rotatably adjusted against a second portion thereof to seal parts of said conduit together, said torque limiting collar comprising:
   (a) a support member for rigid connection to said stationary structure between said stationary structure and said fitting;
   (b) a locking member including means for engaging one of said first and second portions of said fitting to prevent said one fitting portion from rotating relative to said locking member; and
   (c) means for rigidly fastening said locking member to said support member, said fastening means including,
      means defining a first plurality of holes in said support member, and means defining a second plurality of openings in said locking member, said second plurality of openings being aligned with said first plurality of holes when said locking member engages said one fitting portion;
      wherein said holes and openings in said respective first and second pluralities thereof are in the form of elongated slots orthogonally oriented to ensure alignment between said pluralities of holes and openings when said locking member engages said one fitting portion; and
      a plurality of bolts received through said aligned holes and openings and rigidly connecting said support member and locking member together.

2. A torque limiting collar for rigidly coupling a fitting to a stationary structure to prevent transmission of damage-inducing torque through said fitting to a conduit as a first portion of said fitting is rotatably adjusted against a second portion thereof to seal parts of said conduit together, said torque limiting collar comprising:
   (a) a support member for rigid connection to said stationary structure between said stationary structure and said fitting, said support member including:
      a plate portion containing an opening for receiving said fitting and conduit to allow positioning of said support member adjacent said fitting and conduit; and
      a stand-off portion connected to said plate portion for positioning the same adjacent said fitting and conduit and for rigidly interconnecting said plate portion and said stationary structure;

(b) a locking member including means for engaging one of said first and second portions of said fitting to prevent said one fitting portion from rotating relative to said locking member; and (c) means for rigidly fastening said locking member to said support member.

3. The collar as recited in claim 2, wherein said stand-off portion is an integral part of said support member.

4. The collar as recited in claim 2, wherein said stand-off portion is a separate threaded fastener adjustable for rigidly interconnecting said plate portion to said support structure.

* * * * *